United States Patent [19]

Miyawaki et al.

[11] Patent Number: 5,203,228

[45] Date of Patent: Apr. 20, 1993

[54] JOINT STRUCTURE BETWEEN CRANKSHAFT AND CONNECTING ROD

[75] Inventors: Nobuyuki Miyawaki; Fukumitsu Kitauchi, both of Osaka, Japan

[73] Assignee: Koyo Seiko Co., Ltd., Osaka, Japan

[21] Appl. No.: 946,144

[22] PCT Filed: Jun. 16, 1989

[86] PCT No.: PCT/JP89/00604

§ 371 Date: Jan. 29, 1991

§ 102(e) Date: Jan. 29, 1991

[87] PCT Pub. No.: WO89/12760

PCT Pub. Date: Dec. 28, 1989

Related U.S. Application Data

[63] Continuation of Ser. No. 623,402, Jan. 29, 1991, abandoned.

[30] Foreign Application Priority Data

Jun. 17, 1988 [JP] Japan ............... 63-80966

[51] Int. Cl.⁵ ............... G05G 1/00; F16C 33/34
[52] U.S. Cl. ............... 74/579 R; 74/579 E; 74/595; 123/197.4; 384/565; 384/907.1; 384/492; 384/913
[58] Field of Search ............... 74/579 R, 579 E, 587, 74/594, 595; 384/907.1, 548, 565, 913, 492; 123/197.3, 197.4

[56] References Cited

U.S. PATENT DOCUMENTS

| | | | |
|---|---|---|---|
| 3,086,827 | 4/1963 | White | 384/565 |
| 4,550,571 | 11/1985 | Bertsch | 123/197.3 |
| 4,759,644 | 7/1988 | Mizukusa et al. | 384/907.1 |
| 4,770,549 | 9/1988 | Rokkaku et al. | 384/548 |
| 4,776,710 | 10/1988 | Hara | 384/565 |
| 4,806,020 | 2/1989 | Matsuda | 384/907.1 |
| 4,871,266 | 10/1989 | Oda | 384/492 |
| 4,906,110 | 3/1990 | Van Wyk et al. | 384/565 X |
| 4,909,204 | 3/1990 | Machida | 123/197.4 X |
| 4,960,405 | 10/1990 | Katayama et al. | 475/183 |
| 4,969,430 | 11/1990 | Masuda | 123/197.4 |
| 5,017,022 | 5/1991 | Ruggles et al. | 384/907.1 X |
| 5,063,881 | 11/1991 | Kawamura | 384/907.1 X |
| 5,067,826 | 11/1991 | Lemelson | 384/907.1 X |

FOREIGN PATENT DOCUMENTS

| | | | |
|---|---|---|---|
| 59-64844 | 3/1984 | Japan . | |
| 60-58920 | 4/1985 | Japan . | |
| 63-14101 | 4/1988 | Japan | 74/579 E |
| 0120918 | 5/1988 | Japan | 384/565 |
| 0112016 | 4/1989 | Japan | 384/492 |

Primary Examiner—Vinh T. Luong
Attorney, Agent, or Firm—Mason, Fenwick & Lawrence

[57] ABSTRACT

A joint structure is provided between a crankshaft rotated within a crankcase of an engine and a connecting rod an end of which is jointed to the crankshaft via a bearing and the other end of which is jointed to a piston reciprocated within a cylinder of the engine. The large end of the crankshaft is provided with an aperture for receiving the crankpin at the other periphery of the crankshaft. The bearing is positioned at the inner periphery of the aperture, and comprises a plurality of needle rollers made of a ceramic material having silicon nitride as one of the main ingredients. A cage is provided for positioning and retaining the plurality of needle rollers at equal intervals along its periphery. The bearing is lubricated by a lubricant contained within a gas mixture supplied to the engine. Since the needle rollers of the bearing are composed of a very hard, light, and heat-resistive material, the junction structure is more reliable and runs well under severe conditions over a longer period of time.

4 Claims, 2 Drawing Sheets

JOINT STRUCTURE BETWEEN CRANKSHAFT AND CONNECTING ROD

This application is a continuation of U.S. patent application Ser. No. 623,402, filed Jan. 29, 1991 now abandoned.

FIELD OF THE INVENTION

The present invention relates to a joint structure between a crankshaft and a connecting rod and, more particularly, to a joint structure between a crankshaft rotated within a crankcase of an engine, and a connecting rod, an end of which is jointed to the crankshaft via a bearing and the other end of which is jointed to a piston reciprocated within a cylinder of the engine.

BACKGROUND OF THE INVENTION

In a two-stroke internal combustion engine used for a motorcycle or an outboard motor of a ship, usually a mixture of gasoline and oil is used as the fuel. However, in a motorcycle driven a cold area in which a snow-removal agent is spread on a road, or in an outboard motor exposed to seawater, air containing salt from the surrounding atmosphere is introduced from a carburetor to the crankcase in addition to the mixture of gasoline and oil, so that a supporting bearing for jointing within the high-temperature crankcase can be easily corroded. Further, in the case of the motorcycle, because the oil in the exhausted gas released from the exhaust pipe (muffler) can attach on and dirty the back of the rider, in recent years, the proportion of the oil is reduced so that the ratio between the gasoline and oil in the mixture is changed from the conventional range of 15:1 to 50:1 to a ratio of 200:1. However, reducing the proportion of oil severely affects the lubrication of the bearing. If the bearing is rotated at a high speed of 10,000 to 30,000 rpm at a high temperature of 150° C. through 200° C., it may be easily burnt out to thereby shorten the life time of the bearing or the life time of the engine.

On the other hand, in accordance with the high performance of the engine in recent years, the roller bearing in the joint structure between the crankshaft and the connecting rod requires a high performance. That is, when the bearing is rotated at a high speed at a high temperature, a PV value is required to be reduced. The bearing is required to be extremely hard.

However, at the present time, any joint structure meeting with the above requirements to resolve the problems has not been proposed. In the meantime, in a particular field of industry such as the machine tool industry, to make a high performance bearing, a cylinder roller bearing and a ball bearing are provided with a rotator made of a ceramic material as proposed. The ceramic is usually hard as compared with a bearing steel, but it has inferior toughness. Therefore, conventionally, the ceramic can be used in practice as a rotator of a ball bearing, or a roller bearing whose length is about 1.5 times the length of the diameter. However, the shape in which a needle roller is formed does not have good sintering properties. In particular, no needle roller has been proposed which has a corrosion resistance suitable for driving under the severe conditions present in the crankcase of an engine.

Incidentally, a roller used in a needle roller bearing is defined to be $Da \leq 5mm$, $3Da \leq l \leq 10DA$ under the Japanese Industrial Standard (JIS) B1506 where the diameter is Da and the length is l.

SUMMARY OF THE INVENTION

The object of the present invention is to provide a reliable joint structure between a crankshaft and a connecting rod. The needle roller within the cage at the joint structure has a longer life before burning out than a conventional needle roller.

Another object of the present invention is to provide a hard, light, and heat resistant needle roller within a cage positioned in a joint structure between a crankshaft and a connecting rold so that the engine can run well under severe conditions over a longer period of time.

DETAILED DESCRIPTION OF THE PREFERRED EMBODIMENTS

Figure 1:
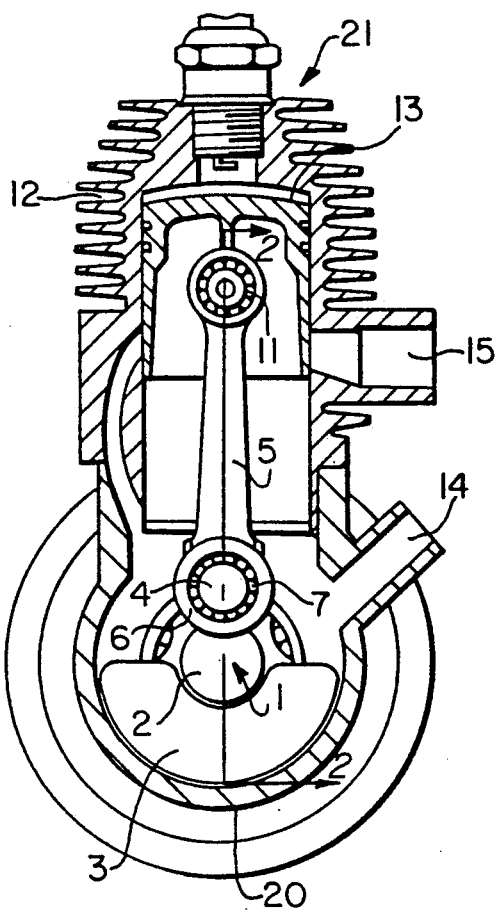
FIG. 1 is a cross-sectional view of a junction structure between a crankshaft and a connecting rod in a two-stroke internal combustion engine according to the present invention.
Figure 2:
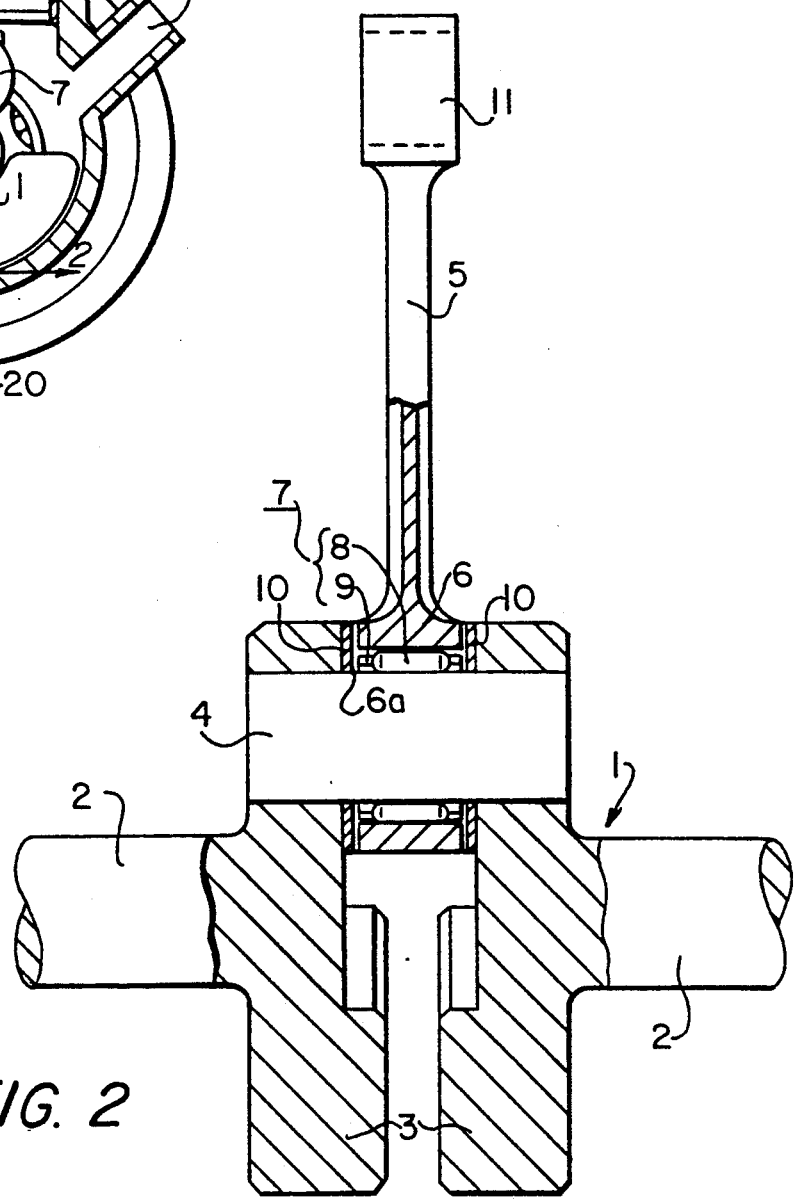
FIG. 2 is a simplified cross-sectional view of the junction between the crankshaft and the connecting rod of FIG. 1, taken along line 2—2 of FIG. 1.

Referring to FIGS. 1 and 2, a junction structure between a crankshaft and a connecting rod according to the present invention comprises at the crankshaft 1 rotated within a crankcase 20 of an engine 21, and the connecting rod 5, an end 6 of which is jointed to the crankshaft 1 via a bearing portion 7 and the other end 11 of which is jointed to a piston 13 reciprocated within a cylinder 12 of the engine 21, as used in the conventional case.

More particularly, the crankshaft 1 comprises a rotational axis 2, a pair of crank webs 3 integral with the rotational axis 2 and opposed to each other, and a crank-pin 4 which is not co-axial with the rotational axis 2, and which is positioned between the crankwebs 3. The connecting rod 5 has a large end 6 having an aperture 6a (shown in FIG. 2) therein. The crank pin 4 is inserted through aperture 6a, and the bearing portion 7 including the cage 9 is positioned in aperture 6a at the outer periphery of the crankpin 4, so that crank pin 4 is rotatably connected to connecting rod 5.

Figure 3:
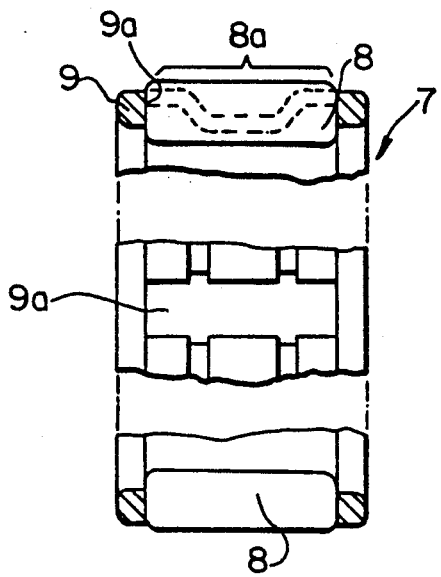
FIG. 3 is a longitudinal sectional view of an assembly of a needle roller bearing and a cage positioned at a bearing portion at the junction structure of FIGS. 1 and 2.

The bearing portion 7 is, as shown in FIG. 3, an assembly without bearing rings and comprises needle rollers 8 and a cage 9. The needle rollers 8 are rotatably supported within a plurality of pockets 9a equally spaced about the circumference of the cage 9 so that they are prevented from being removed in the radial direction. The whole bodies of the needle rollers 9 are made of a ceramic material (a sintered body made of silicon nitride as the chief ingredients) according to the feature of the present invention.

The ceramic material for the needle rollers 8 was invented for use in a roller bearing, and is described in Japanese Patent Application No. 59-64844, which was filed in Japan on Mar. 30, 1984. That is, the ceramic material is silicon nitride ($Si_3N_4$) or Sialon formed in a pressure sintering process such as a hot press process, a hot isostatic press process, or a vapor press sintering process. Because silicon nitride is difficult to sinter, in order to improve sintering, as well as the strength and life span of the ceramic material, while sintering the silicon nitride, a rare earth metal oxide, preferably yttria ($Y_2O_3$), and aluminum oxide such as $Al_2O_3$ if necessary should each be added in a total amount of less than 10% by weight. When necessary to improve the sintering property, aluminum nitride in an amount of less than 10% by weight, or titanium oxide, zirconium oxide, magnesia, molybdenum, carbide, spinel, garnet, etc. in an amount of less than 5% by weight is added. Although as the ratio between the above-described sintering additives and silicon nitride increases, sintering becomes easier, the resistance to corrosion by an electrolyte decreases. Thus, it is preferred to add each of the above-described sintering additives in an amount of less than 10% by weight. Especially, in order to form the shape of the needle roller, because of the requirement of high corrosion-resisting properties in severe conditions, the total amount of yttria and aluminum oxide is preferred to be less than 10% by weight.

Figure 4:
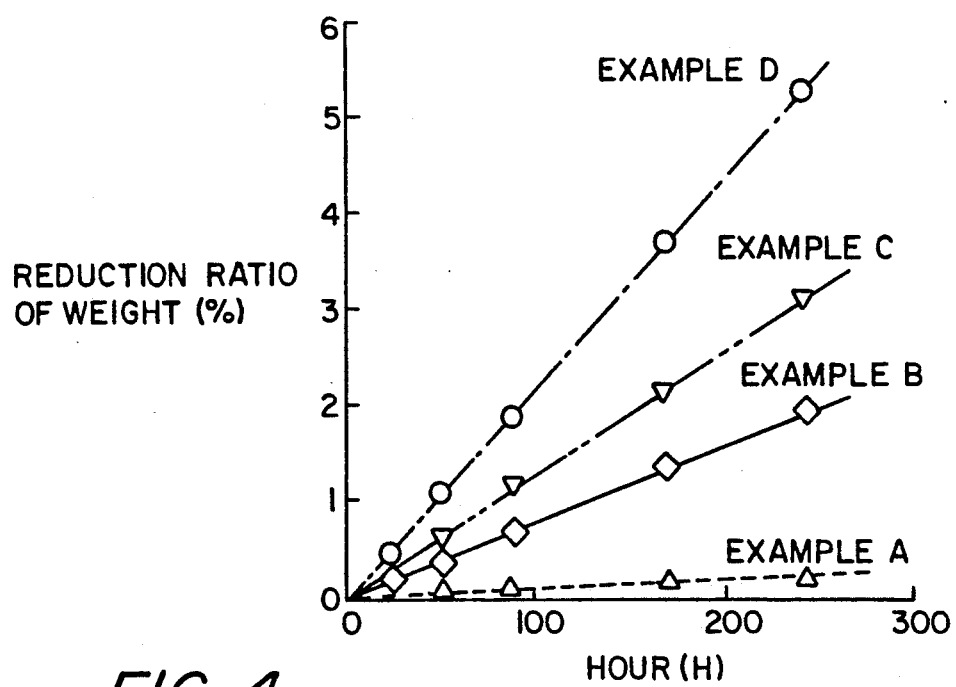
FIG. 4 is a graph showing a corrosion resistance test of the material of a needle roller in accordance with the present invention.

FIG. 4 shows a graph representative of a corrosion resistance test of silicon nitride used for the present invention. The data are a reduction ratio of weight when the samples are sintered within a water solution of 1 mol HCl at 80° C. Table 1 shows the ingredients of the samples.

TABLE 1

| Sample | Main Ingredient | Additive | Sintering Process |
|---|---|---|---|
| Example A | $Si_3N_4$ $Y_2O_3$ | 5% by weight [%] | HP |
| | $Al_2O_3$ | 2% by weight [%] | |
| Example B | $Si_3N_4$ $Y_2O_3$ | 5% by weight [%] | HIP |
| | $Al_2O_3$ | 4% by weight [%] | |
| | AlN | 4% by weight [%] | |
| | $TiO_2$ | 1% by weight [%] | |
| Example C | $Si_3N_4$ $Y_2O_3$ | 8% by weight [%] | HIP |
| | $Al_2O_3$ | 6% by weight [%] | |
| | AlN | 3% by weight [%] | |
| Example D | $Si_3N_4Y_2O_3$ | 11% by weight [%] | Normal Pressure |
| | $Al_2O_3$ | 12% by weight | |

HP is a hot press sintering process. HIP is a hot isostatic press sintering process. The hot isostatic press sintering process in this case is preferred to the sintering process where the mixing powder is sintered directly, or the mixing powder is sintered at the normal pressure and the HIP process is made.

FIG. 4 shows that the needle roller of this invention (examples A and B) have less percentage by weight of sintered silicon nitride than the needle rollers in examples C and D, and indicates good corrosion resistance of the sintered silicon nitride used here.

A conventional needle roller, especially the high speed corresponding product used in the juncture structure between the crankshaft and the connecting rod, is made of SUJ2. When the conventional needle roller is compared to the needle roller of the present invention is made of the material of example B as shown in Table 1, the results are as follows:

(1) The hardness of the needle roller of the present invention is HV 1300 through HV2000, while that of the conventional needle roller is HV746 through HV865. However, since the temperature of the crankcase is as high as about 150° C. through 200° C., even after surface hardening treatment, the conventional needle roller becomes softened.

(2) The basic static load rating (the static load uniformly distributed for generating the maximum contact stress at the center of the contact) of the needle roller of the present invention is 6000 MPa, while that of the conventional needle roller is 4000MPa.

(3) For reduction of weight, the specific gravity of the conventional needle roller is 7.8 while that of the needle roller of the present invention is 3.2, so that the weight ratio of the needle of the present invention to that of the conventional needle roller is 1:2.4. Therefore, when the internal diameter $\phi$ of the bearing is 22 and the engine is rotated at 10,000 rpm through 13,000 rpm, the PV value becomes 3.5 to 24.5 kg/cm$^2$·m/sec. In the conventional needle roller, the PV value is 10 to 25 Kg/cm$^2$·m/sec. Thus the PV value of the needle roller of the present invention is 0.5 Kg/cm$^2$·m/sec lower than that of the conventional needle roller.

(4) In polishing the needle roller for the present invention, mechanical polishing (using a whetstone) is used due to the hardness of ceramic while in the conventional needle roller, tumbling (barrel polishing) is used. Therefore, there is very little roughness in the surface of the needle roller of the present invention, and the needle roller can be slid smoothly in the pocket of the cage to prevent skewing.

A washer 10 is provided between the side of the end (or tip) of the large edge 6 of the connecting rod 5 and the crank web 3. An intake aperture 14 for the intake of the oil and gas mixture into the crankcase and an exhaust aperture 15 are exhausting the combustion product are also conventionally provided.

When the ceramic roller is thus adapted according to the present invention, normally, the crank pin (corresponding to the inner raceway) of the crankshaft and the connecting rod are made of chrome-molybdenum steel, so that the sliding surfaces are made of different materials.

In particular, under the conditions of a high temperature and an anticorrosive atmosphere, adhesion phenomena can be prevented to avoid burn out of the bearing portion 7 early in its life. The ceramic roler is very durable under conditions where a metal roller may be exfoliated. Therefore, the ceramic roller can be driven under severe conditions such as in the junction portion of the connecting rod for a two-stroke engine, so that compared with a conventional metal needle roller, the life time of the needle roller 8 before it burns out is extended.

The needle roller 8 of the present invention may be such that the base metal is any metal such as bearing steel and a thin film of a ceramic material is coated at least on a rotating surface 8a of the needle roller 8. Further, the thus-described needle roller 8 may be used at the small end 11 of the connecting rod 5.

Since the needle roller 8 in the joint structure of the present invention is made of a ceramic, its hardness and net rated load is high, so that the damage at the edge load is reduced. It is not necessary for the needle roller 8 to be crowned at both ends, unlike the conventional needle roller. Even if the needle roller of the present invention is crowned, the degree of crowning can be lessened. As a result, the effective contact area between the needle roller and the raceway portion can be enlarged, which is an advantage for the needle roller in the junction structure of the present invention in which high speed and high load-resistance are sought. The production of the needle roller also is made easier.

The cage 9 of the needle roller bearing 7 with the cage is silver-plated after its base is copper-plated to improve the lubrication and corrosion-resistance properties. The outer diameter of the cage 9 is guided on the inner peripheral surface of the aperture at the large edge 6 of the connecting rod 5.

As described above, according to the present invention, the needle roller in the junction structure is made of a ceramic material to provide high hardness and high heat-resistance as well as lightness of weight. This can be used under severe driving conditions such as in a two-stroke engine providing very little lubricant and to prevent injury to the needle roller over a long period of time as compared with a conventional metal needle roller.

We claim:

1. A two-stroke internal combustion engine comprising:
   a cylinder;
   a piston reciprocatable within said cylinder;
   a crankcase;
   a crankshaft rotatable within said crankcase, said crankshaft having a crank pin extending therefrom;
   a connecting rod having a first end connected to said piston and a second end opposite said first end, said second end having an aperture therethrough, said crank pin being inserted in said aperture; and
   a bearing positioned in said aperture between the inner peripheral surface of said aperture and the outer peripheral surface of said crank pin, said bearing including a plurality of needle rollers and a retainer for holding and retaining said needle rollers evenly spaced around the periphery of said retainer, and said needle rollers being made of a sintered ceramic comprising silicon nitride as the main ingredient, and yttria and aluminum oxide in a total amount of less than 10% by weight as sintering additives.

2. The internal combustion engine of claim 1, wherein each of said needle rollers has a mechanically polished working surface.

3. The internal combustion engine of claim 1, wherein said ceramic is sintered with pressure using a hot pressing process.

4. The internal combustion engine of claim 1, wherein said ceramic is sintered with pressure using a hot isostatic pressing process.

* * * * *